Patented Dec. 20, 1932

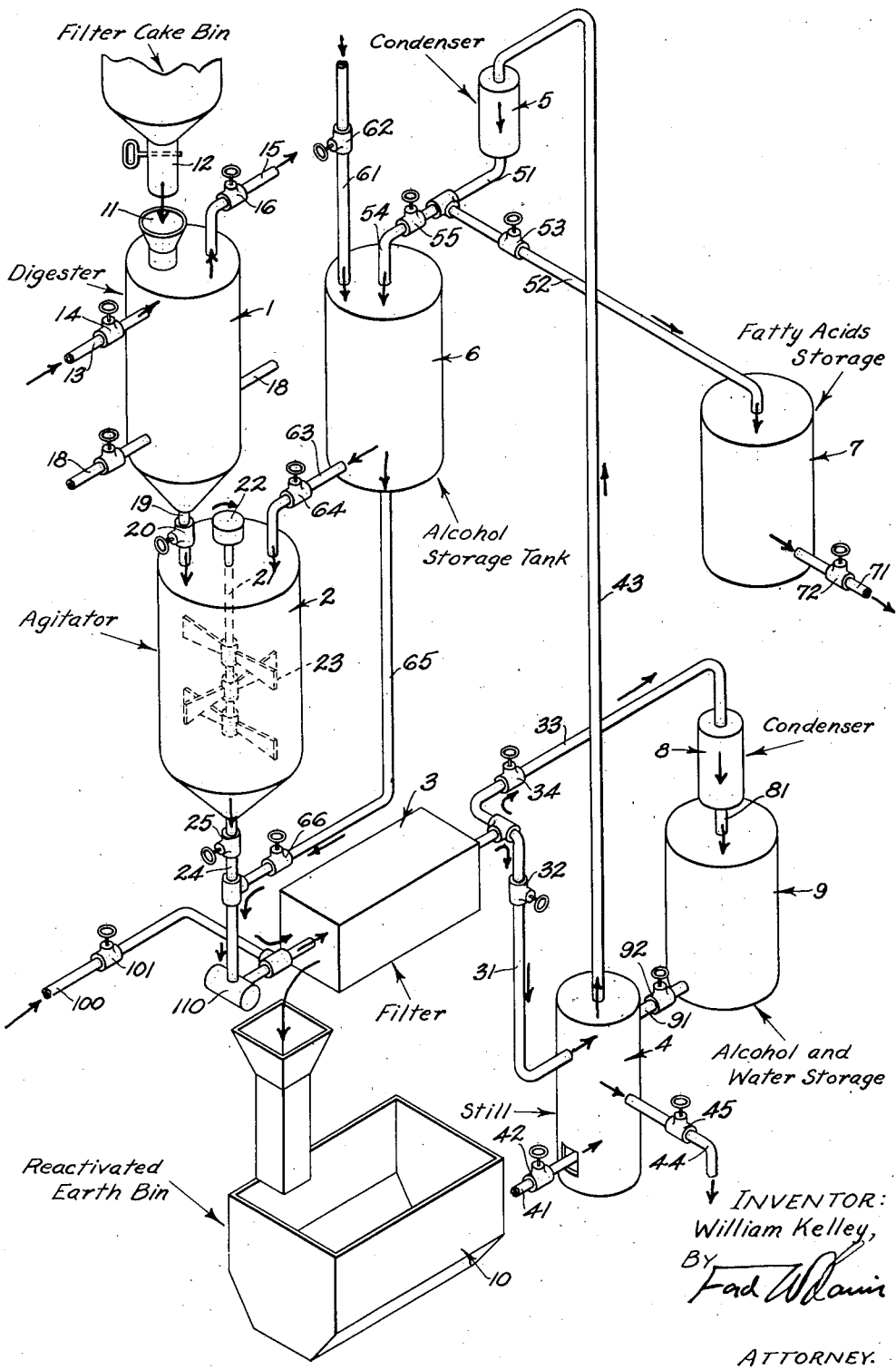

1,891,715

UNITED STATES PATENT OFFICE

WILLIAM KELLEY, OF LOS ANGELES, CALIFORNIA, ASSIGNOR OF ONE-HALF TO WALTER S. BAYLIS, OF LOS ANGELES, CALIFORNIA

METHOD OF RECOVERING RETAINED OIL AND FATS FROM FILTER-PRESS CAKE AND REACTIVATION OF THE SPENT CAKE

Application filed November 12, 1930. Serial No. 495,154.

My invention relates to the refining of fats and oils and is particularly adapted to be used in connection with the refining of vegetable and animal fats and oils, which are hereinafter for convenience termed "fats".

In the refining of fats it is common practice to mix the fats with various adsorbents, such as fuller's earth, acid-treated clay, and the like, for the purpose of improving their color and odor, these adsorbents being thereafter recovered in a filter-press in the form of a filter cake which carries various impurities adsorbed by the adsorbent from the fats. It is also common practice to filter fats through various adsorbents for the same purpose. As a result of these processes large amounts of filter cake are produced, this filter cake being the residue left in the filter after filtration. This filter cake consists of fuller's earth or other adsorbent material saturated with fat and containing various impurities present in the fat prior to the decolorizing treatment.

At the present time there is no practical process for thoroughly reactivating the adsorbent in the filter cake, nor is there any process by which a complete recovery of the fat carried in the filter cake can be made.

It is an object of my invention to provide a process by which a reactivated fuller's earth or other adsorbent may be produced from the filter cake. In other words, it is an object to so treat the cake that the adsorbent can be recovered and reused in subsequent decolorizing treatment of fats.

It is a further object of the invention to recover from the filter cake the adsorbed fat in the form of valuable and pure fatty acids.

Further objects and advantages will be set forth hereinafter.

Attached hereto is a sketch showing somewhat diagrammatically the apparatus used to carry on my process. The individual pieces of apparatus shown in this sketch are all well known in the chemical industry and particular details of their construction need not be given.

This apparatus consists of a digester 1, an agitator 2, a filter-press 3, a still 4, a condenser 5, an alcohol storage tank 6, a fatty acids storage tank 7, a condenser 8, an alcohol and water storage tank 9, and a reactivated fuller's earth bin 10.

The digester 1 may be of any convenient form but should be so constructed that it is capable of safely withstanding an internal pressure of at least 150 pounds per square inch. The digester 1 is provided with a jacket through which hot oil may be circulated for the purpose of heating its contents. The digester 1 may be charged through a charging inlet 11 through a chute 12 leading to a filter cake bin, not shown. The digester is provided with a water supply pipe 13 having a valve 14, with a steam vent pipe 15 having a valve 16, with pipes 18 for supplying and withdrawing hot oil from the jacket, and with an outlet pipe 19 having a valve 20.

The pipe 19 leads to the agitator 2, which may be of any convenient form, that shown being provided with a central shaft 21 driven by any convenient means not shown through a pulley 22, and provided with paddles 23 by which the material in the agitator may be thoroughly mixed. The agitator is provided with an outlet pipe 24 having a valve 25. The pipe 24 delivers material to the filter 3, which may be of any convenient form. The liquid passing through the filter is delivered to a pipe 31 having a valve 32, or to a pipe 33 having a valve 34. The pipe 31 delivers material to the still 4. The still 4 may be of any convenient construction and may be heated by gas or oil supplied through a pipe 41 having a valve 42.

Vapor from the still is delivered to a pipe 43 and liquid may be withdrawn from the bottom of the still through a pipe 44 having a valve 45. The vapor pipe 43 connects to the condenser 5. The condenser 5 may be of any convenient form and may be air or water cooled by any convenient means not shown.

Liquid condensed in the condenser 5 is delivered to a pipe 51 and either to a pipe 52 through a valve 53 or to a pipe 54 through a valve 55. Pipe 54 connects to the alcohol storage tank 6 and the pipe 52 connects to the fatty acids storage tank 7.

Alcohol storage tank 6 is provided for the storage of alcohol at various times during the operation. Alcohol may be initially supplied thereto through a pipe 61 having a valve 62. Alcohol may be withdrawn from the alcohol storage tank through a pipe 63 having a valve 64, and delivered into the top of the agitator 2. Alcohol may also be withdrawn from the bottom of the alcohol storage tank 6 through a pipe 65 having a valve 66, the alcohol passing from the pipe 65 through the pipe 24 into the filter 3. The fatty acids storage tank 7 may be of any convenient form provided with an outlet pipe 71 having a valve 72 through which the fatty acids may be delivered to additional storage or the point of use.

The condenser 8 may be any convenient form of condenser either air or water cooled, and it is provided with a pipe 81 delivering the condensates into the alcohol and water storage tank 9. The alcohol and water storage tank 9 is also any convenient form of tank and is provided with a pipe 91 having a valve 92 through which liquids may be delivered from the tank 9 into the still 4. Steam may be supplied to the pipe 24 through a pipe 100 having a valve 101.

The method of operation of the invention is as follows.

The digester is first charged with filter cake containing the fats to be recovered. This filter cake has been produced in the previous decolorizing treatment of the fats and contains various impurities present in the raw oil so treated, as well as a considerable percentage, possibly 25% by weight, of oil, with which the cake is soaked.

As stated above, it is an object of the invention to recover both the adsorbent and the fats from this filter cake.

The digester 1 having been charged, the charging opening is closed and water is delivered to the digester through the pipe 13 by opening the valve 14. Sufficient water is run into the digester to form a paste with the filter cake therein. The valve 20 is, of course, closed during the filling operation and the valves 14 and 16 are now closed and hot oil is circulated through the jacket of the digester by means of pipe 18. The temperature of the digester is raised as rapidly as convenient to from 350° to 400° F., which converts the water in the digester into steam and generates a pressure therein. I have found that a pressure of approximately 150 pounds per square inch is quite efficient for my purpose.

In the practical operation of my invention I continue the digestion for a period of about three hours. During this digestion the fats contained in the original filter cake are split up into fatty acids. It is a well known fact that the application of heat and pressure to various vegetable and animal fats produces fatty acids. This conversion, so far as I am aware, is not a complete conversion in the processes ordinarily practiced. I find that due to the presence of the adsorbent in the digester, a complete conversion of the fats into fatty acids is produced. This I believe is due to the fact that the fats are present in the digester in a very finely divided condition due to their being carried in small particles of the adsorbent.

As soon as the digestion is complete, the valve 16 is opened and the steam in the digester is allowed to escape through the pipe 15, the pressure in the digester of course falling very rapidly to atmospheric pressure.

Due to the high temperature of the material in the digester when the valve 16 is opened, substantially all of the water in the paste escapes in the form of steam, leaving the adsorbent material containing the impurities and the fatty acids in the digester.

During the escape of the steam the digester cools rapidly and, if necessary, cool water may be circulated through the jacket for the purpose of reducing the temperature either before or after the valve 16 is opened. The temperature should not, however, be reduced sufficiently to prevent substantially all of the water escaping as steam, leaving the material in the digester practically free from water.

As soon as the material in the digester has cooled to approximately 140° F., the valve 20 is opened and the material is allowed to escape into the agitator 2. The valve 10 is then opened and the alcohol is run into the agitator.

In the practical operation of my invention I, of course, use denatured grain alcohol as a matter of convenience. It is desirable to supply to the agitator alcohol to the amount of three to five times the weight of the adsorbent therein. During the time the agitator is being filled with alcohol and for a short period thereafter, the paddles 23 are vigorously turned to agitate and mix the alcohol with the adsorbent.

As soon as the mixing is complete, the valves 101 and 66 being closed, the valve 25 is opened and the mixture of adsorbent and alcohol is run through the pipe 24 to pump 110 which forces the mixture through the filter 3. In the filter 3 the solid material is separated from the liquid, the liquid consisting of free fatty acids and alcohol, and containing substantially all of the impurities originally separated in the decolorizing operation which produced the original filter cake.

The valve 34 being closed and the valve 32 being opened, the liquid is pumped into the still 4, the valve 45 being closed. The still is then heated by means of fuel delivered through the fuel pipe 41 and as the temperature of the still is gradually raised, the alcohol starts to distil off as a vapor, passing through the pipe 43 to the condenser 5. The valve 53 being closed and the valve 55 being opened, the alcohol passing into the condenser 5 is delivered to the alcohol storage tank 6 from which it may be reused from time to time.

As soon as the distillation of the alcohol is complete, the temperature of the still is raised further, the valve 55 being closed and the valve 53 being opened. The fatty acids then start to distil off from the still 4, passing upwardly through the pipe 43 to the condenser 5 in which they are condensed and delivered through the pipes 51 and 52 to the fatty acids storage tank 7, from which they may be withdrawn from time to time through the pipe 71, and the valve 72, as it is desired to utilize them.

The filtering operation in the filter 3 is continued until substantially all of the material in the agitator has been delivered to the filter 3, the liquid having passed therethrough and the solids remaining in the form of a filter cake therein.

As soon as the filtering operation is completed, the valves 101 and 25 are closed and the valve 66 is opened so that alcohol is delivered from the alcohol storage tank through the pipe 65 to the pump 110. This alcohol is forced through the filter cake for a sufficient time to substantially free it from fatty acids. In other words, the filter cake is thoroughly washed with the alcohol to remove all traces of fatty acids. During this operation the alcohol passes through the valve 32 into the still 4, from which it is distilled as previously explained, being delivered through the condenser 5 to the alcohol storage tank 6.

As soon as the cake is thoroughly washed with the alcohol, the valves 66 and 32 are closed and the valve 34 is opened. The valve 101 is now opened and superheated steam is delivered through the pump 110 to the filter 3, this steam passing through the filter cake in the filter and through the pipe 33 into the condenser 8. During its passage through the filter the steam vaporizes the alcohol remaining in the cake so that at the conclusion of the steam blowing operation the cake is substantially free from alcohol.

The vapor passing through the pipe 33 contains both steam and alcohol which are condensed in the condenser 8 and delivered in the form of liquid to the alcohol and water storage tank 9 in which the alcohol and water are held until sufficient is accumulated to permit a distillation operation to be carried on therein. This distillation operation is carried on by closing the valve 32 and opening the valve 92, allowing the alcohol and water to pass from the storage tank 9 into the still 4. The still is now heated to a sufficient degree to drive off the alcohol in the form of vapor and the valve 53 being closed and the valve 55 being opened, this alcohol vapor is condensed in the condenser 5 and delivered in the form of pure alcohol to the alcohol storage tank 6. Water or other material remaining in the still 4 after any distillation operation may be removed through the pipe 44 by opening the valve 45.

At the conclusion of the steaming operation of the filter cake, the valve 101 is closed and the steam is allowed to slowly escape from the cake through the pipe 33. The filter 3 is then opened and the adsorbent material is delivered to the reactivated fuller's earth bin 10. This reactivated fuller's earth is in a very pure and highly activated condition, being substantially free from impurities which have been removed therefrom during the filtering and alcohol washing operations.

I have found that fuller's earth and other adsorbent materials when treated in this manner are fully as active as they were prior to the original decolorizing operation and in the case of some commercial adsorbents I find that the various operations just described considerably increase their efficiency.

I have also found that fuller's earth and other adsorbents so reactivated may be repeatedly used without material loss in efficiency, thus producing economy in the decolorizing operation.

As already stated, I have found that by conducting the digestion in the presence of an adsorbent, all of the fats present in the original cake are split up into fatty acids. The fatty acids, which are eventually delivered to the fatty acids storage tank 7, are free from color or objectionable odor and are of a very high commercial value.

It will be seen that by my process I reclaim the spent fuller's earth, producing therefrom a fuller's earth of high activity, and fatty acids of great commercial value.

I claim as my invention:

1. A process of utilizing vegetable fats and oils contained in spent filter cake which comprises: mixing said filter cake with water; subjecting the mixture to sufficient heat and pressure to convert the fats and oils into fatty acids; removing the water from the mixture dissolving the fatty acids in a solvent; filtering out the solid materials; and separating the fatty acids from the solvent.

2. A process of utilizing vegetable fats and oils contained in spent filter cake which comprises: mixing said filter cake with water; subjecting the mixture to sufficient heat and pressure to convert the fats and oils into fatty acids; reducing the pressure by allowing the water vapor to escape; dissolving the fatty acids and the impurities absorbed by said cake in a solvent; filtering out the solid materials; and separating the fatty acids and said impurities from the solvent by fractional distillation.

3. A process of utilizing vegetable fats and oils contained in spent filter cake which comprises: mixing said filter cake with water; subjecting the mixture to sufficient heat and pressure to convert the fats and oils into fatty acids; removing the water from the mixture; dissolving the fatty acids in alcohol; filtering out the solid materials; and separating the fatty acids from the alcohol.

4. A process of utilizing vegetable fats and oils contained in spent filter cake which comprises: mixing said filter cake with water; subjecting the mixture to sufficient heat and pressure to convert the fats and oils into fatty acids; reducing the pressure by allowing the water vapor to escape; dissolving the fatty acids and the impurities absorbed by said cake in alcohol; filtering out the solid materials; and separating the fatty acids and said impurities from the alcohol by fractional distillation.

5. A process of reactivating spent filter cake containing vegetable oils or fats which comprises: subjecting said filter cake in the presence of steam to sufficient temperature and pressure to convert the oils and fats into fatty acids; allowing the water to escape from said mixture in the form of steam until the pressure is approximately atmospheric; and removing said fatty acids from said cake by the use of a suitable solvent.

6. A process of reactivating spent filter cake containing vegetable oils or fats which comprises: subjecting said filter cake in the presence of steam to sufficient temperature and pressure to convert the oils and fats into fatty acids; allowing the water to escape from said mixture in the form of steam until the pressure is approximately atmospheric; and removing said fatty acids and other impurities from said cake by the use of a suitable solvent.

7. A process of reactivating spent filter cake containing vegetable oils or fats which comprises: subjecting said filter cake in the presence of steam to a sufficient temperature and pressure to convert said oils or fats into fatty acids; maintaining said temperature and pressure for a sufficient period to completely convert said oils or fats into fatty acids; reducing the pressure by allowing the water vapor to escape from the mixture; dissolving the fatty acids and other impurities in a solvent; and separating said solvent from said cake.

8. A process of reactivating spent filter cake containing vegetable oils or fats which comprises: subjecting said filter cake in the presence of steam to a sufficient temperature and pressure to convert said oils or fats into fatty acids; maintaining said temperature and pressure for a sufficient period to completely convert said oils or fats into fatty acids; reducing the pressure by allowing the water vapor to escape from the mixture; dissolving the fatty acids and other impurities in a solvent; separating said solvent from said cake; and steaming said cake.

9. A process of reactivating spent filter cake containing vegetable oils or fats which comprises: subjecting said filter cake in the presence of steam and under pressure to a temperature of at least 350° F.; maintaining said temperature and pressure until the fats or oils are completely separated into fatty acids; releasing the pressure by allowing the water vapor to escape from the mixture; dissolving the fatty acids and other impurities in a solvent; and separating said solvent from said cake.

10. A process of reactivating spent filter cake containing vegetable oils or fats which comprises: subjecting said filter cake in the presence of steam and under pressure to a temperature of at least 350° F.; maintaining said temperature and pressure for approximately three hours; releasing the pressure by allowing the water vapor to escape from the mixture; dissolving the fatty acids and other impurities in alcohol; and separating said alcohol from said cake.

In testimony whereof, I have hereunto set my hand at Los Angeles, California, this 3rd day of November, 1930.

WILLIAM KELLEY.